United States Patent
Kumar (10) Patent No.: US 10,404,580 B2
(45) Date of Patent: Sep. 3, 2019

(54) NETWORK LEVEL PROTECTION ROUTE EVALUATION SYSTEMS AND METHODS

(71) Applicant: Ciena Corporation, Hanover, MD (US)

(72) Inventor: Brahm Kumar, Faridabad (IN)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/448,700

(22) Filed: Mar. 3, 2017

(65) Prior Publication Data

US 2018/0212866 A1 Jul. 26, 2018

(30) Foreign Application Priority Data

Jan. 20, 2017 (IN) .............................. 201711002225

(51) Int. Cl.
*H04L 12/707* (2013.01)
*H04L 12/24* (2006.01)

(52) U.S. Cl.
CPC .......... *H04L 45/22* (2013.01); *H04L 41/0654* (2013.01)

(58) Field of Classification Search
CPC .. H04L 43/0864; H04L 45/125; H04L 41/064
See application file for complete search history.

(56) References Cited

U.S. PATENT DOCUMENTS

| | | | | |
|---|---|---|---|---|
| 2002/0176131 A1* | 11/2002 | Walters | ...................... | G06F 8/65 398/58 |
| 2004/0205238 A1* | 10/2004 | Doshi | ................. | H04L 41/0663 709/241 |
| 2004/0205239 A1* | 10/2004 | Doshi | ................. | H04J 14/0227 709/241 |
| 2008/0181102 A1* | 7/2008 | Del Regno | ............. | H04L 45/00 370/223 |
| 2011/0222846 A1* | 9/2011 | Boertjes | ............... | H04J 14/0212 398/1 |
| 2013/0121684 A1* | 5/2013 | Smith | ................ | H04Q 11/0067 398/5 |
| 2013/0129341 A1* | 5/2013 | D'Errico | ............. | H04B 10/032 398/5 |
| 2014/0126899 A1 | 5/2014 | Prakash et al. | | |
| 2014/0205278 A1 | 7/2014 | Kakkar et al. | | |

(Continued)

OTHER PUBLICATIONS

Mannie; Generalized Multi-Protocol Label Switching (GMPLS) Architecture; Network Working Group; Standard Tracks; The Internet Society; Oct. 2004; pp. 1-69.

(Continued)

*Primary Examiner* — Asad M Nawaz
*Assistant Examiner* — Syed Ali
(74) *Attorney, Agent, or Firm* — Clements Bernard Walker PLLC; Christopher L. Bernard; Lawrence A. Baratta, Jr.

(57) ABSTRACT

A method of network level protection route evaluation and remediation in a network includes defining thresholds for one or more services, wherein the thresholds define how many expected alternate protection routes are available for the one or more services for network level restoration; periodically evaluating a number of available alternate protection routes for the one or more services; notifying a network operator responsive to the number of available alternate protection routes being below the thresholds; and performing one or more remedial actions in the network based on the notifying.

16 Claims, 6 Drawing Sheets

(56) References Cited

U.S. PATENT DOCUMENTS

2015/0222557 A1* 8/2015 Bhattacharya .......... H04L 47/32
                                                        370/237
2015/0334005 A1   11/2015 Tripathi et al.
2016/0043797 A1    2/2016 Sareen et al.
2016/0378624 A1* 12/2016 Jenkins, Jr. ......... G06F 11/1076
                                                        714/6.3

OTHER PUBLICATIONS

International Telecommunication Union; "Distributed Call and Connection Management: Signalling Mechanism Using GMPLS-RSVP-TE"; ITU-T G.7713.2/Y.1704.2; Telecommunication Standardization Sector of ITU; Mar. 2003; pp. 1-46.
International Telecommunication Union; "Architecture for the automatically switched optical network"; ITU-T G.8080/Y.1304; Telecommunicaton Standardization Sector of ITU; Feb. 2012; pp. 1-124.
Open Networking Foundation; "OpenFlow Switch Specification"; OpenFlow Spec; openflow-spec-v1.0.0; Version 1.0.0 (Wire Protocol 0x01); Dec. 31, 2009; pp. 1-44.

* cited by examiner

NETWORK LEVEL PROTECTION ROUTE EVALUATION SYSTEMS AND METHODS

FIELD OF THE DISCLOSURE

The present disclosure generally relates to optical networking systems and methods. More particularly, the present disclosure relates to network level protection route evaluation systems and methods which advantageously enable proactive measures to address the risk that connections will not be able to restore given a network event.

BACKGROUND OF THE DISCLOSURE

Networks, such as using Dense Wave Division Multiplexing (DWDM), Optical Transport Network (OTN), Ethernet, Multiprotocol Label Switching (MPLS), and the like, are deploying control plane systems and methods. Control planes provide an automatic allocation of network resources in an end-to-end manner. Exemplary control planes may include Automatically Switched Optical Network (ASON) as defined in ITU-T G.8080/Y.1304, Architecture for the automatically switched optical network (ASON) (February 2012), the contents of which are herein incorporated by reference; Generalized Multi-Protocol Label Switching (GMPLS) Architecture as defined in IETF Request for Comments (RFC): 3945 (October 2004) and the like, the contents of which are herein incorporated by reference; Optical Signaling and Routing Protocol (OSRP) from Ciena Corporation which is an optical signaling and routing protocol similar to Private Network-to-Network Interface (PNNI) and Multi-Protocol Label Switching (MPLS); or any other type control plane for controlling network elements at multiple layers, and establishing connections among nodes. Control planes are configured to establish end-to-end signaled connections such as Subnetwork Connections (SNCs) in ASON or OSRP and Label Switched Paths (LSPs) in GMPLS and MPLS. Note, as described herein, SNCs and LSPs can generally be referred to as services, calls, connections, etc. in the control plane and are referred to herein as services. Control planes use the available paths to route the services and program the underlying hardware accordingly.

In addition to control planes, which are distributed, a centralized method of control exists with Software Defined Networking (SDN) which utilizes a centralized controller. SDN is an emerging framework which includes a centralized control plane decoupled from the data plane. SDN provides the management of network services through abstraction of lower-level functionality. This is done by decoupling the system that makes decisions about where traffic is sent (the control plane) from the underlying systems that forward traffic to the selected destination (the data plane). An Example of SDN includes OpenFlow (www.opennetworking.org/sdn-resources/onf-specifications/openflow/), the contents of all are incorporated by reference herein. Note, distributed control planes can be used in conjunction with centralized controllers in a hybrid deployment such as using the controller for overall management and the control plane for implementing connections based on controller input.

Restoration (also referred to as protection) is a key feature in networks where a backup (protection) path takes over for an active (working) path of a service when there is a failure in the active path. Restoration can include dedicated, reserved protection paths (e.g., 1+1) for working paths which provide extremely fast restoration (sub-50 ms) at the expense of inefficient bandwidth usage, i.e., the protection paths are active and unused in the network. At the other end of restoration time is mesh restoration which includes computing paths at the time of failures and can lead to several seconds for restoration. Various techniques are used in between these extremes (dedicated protection and mesh restoration with path computation upon failures) to balance the inefficient use of bandwidth versus restoration time.

In the context of network level protection, e.g., mesh restoration and variants thereof, the protection path is not necessarily known a priori; although some mesh restoration techniques provide precomputed paths. Network-level protection provides a determination of the protection path at the time of the network event contrasted with dedicated protection (e.g., 1+1) which has a dedicated path already provisioned. Thus, in network level protection, there are no assurances for a service. At best, the network operator knows there will be multiple attempts to restore the service, and there will be a notification (alarm) if the service is unable to restore. This makes proactive planning difficult. There are no available mechanisms for a network operator to provide any assurance a priori that a particular service will have a set number of available mesh protection routes available with the set number an adjustable value that can be set by the network operator.

Further, there is no current mechanisms to proactively measure the state of the network level protection over time, e.g., how many alternative protect routes exist for a given service or call at any given time. Such visibility of these proactive measurements would provide valuable insight into the state of the network and any remedial actions required therein.

BRIEF SUMMARY OF THE DISCLOSURE

In an exemplary embodiment, a method of network level protection route evaluation and remediation in a network includes defining thresholds for one or more services, wherein the thresholds define how many expected alternate protection routes are available for the one or more services for network level restoration; periodically evaluating a number of available alternate protection routes for the one or more services; notifying a network operator responsive to the number of available alternate protection routes being below the thresholds; and performing one or more remedial actions in the network based on the notifying. The periodically evaluating can include performing path computation to determine the alternate protection routes based on a current state of the network. The network can utilize a control plane and the network level restoration can include mesh restoration. The thresholds can be separately defined with and without bundle diversity which allows two paths to share at least one common link. The notifying can include one of alarms, warnings, and notifications via one or more of a control plane, a Software Defined Networking (SDN) controller, and a Network Management System (NMSi). The notifying can include one of alarms, warnings, and notifications separated into a plurality of levels with a first level being the one or more services have available alternate protection routes but are below the defined thresholds, a second level being the one or more services have only one available alternate protection route, and a third level being the one or more services have no available alternate protection routes. The remedial actions can be performed based on the plurality of levels. The remedial actions can include one or more of adding additional network capacity through new equipment, defragmenting network links, rerouting existing services for optimization, and increasing optical bandwidth through programmable modulation and baud rates.

In another exemplary embodiment, an apparatus configured to perform network level protection route evaluation and remediation in a network includes one or more processors; and memory storing instructions that, when executed, cause the one or more processors to receive thresholds for one or more services, wherein the thresholds define how many expected alternate protection routes are available for the one or more services for network level restoration; periodically evaluate a number of available alternate protection routes for the one or more services; notify a network operator responsive to the number of available alternate protection routes being below the thresholds; and instigate one or more remedial actions in the network based on the notify. The periodically evaluation can include a path computation to determine the alternate protection routes based on a current state of the network. The network can utilize a control plane and the network level restoration can include mesh restoration. The thresholds can be separately defined with and without bundle diversity which allows two paths to share at least one common link. The network operator can be notified by one of alarms, warnings, and notifications via one or more of a control plane, a Software Defined Networking (SDN) controller, and a Network Management System (NMS). The network operator can be notified by one of alarms, warnings, and notifications separated into a plurality of levels with a first level being the one or more services have available alternate protection routes but are below the defined thresholds, a second level being the one or more services have only one available alternate protection route, and a third level being the one or more services have no available alternate protection routes. The remedial actions can be performed based on the plurality of levels. The remedial actions can include one or more of adding additional network capacity through new equipment, defragmenting network links, rerouting existing services for optimization, and increasing optical bandwidth through programmable modulation and baud rates.

In a further exemplary embodiment, a network configured to provide network level protection route evaluation and remediation includes a plurality of nodes; a plurality of links interconnecting the plurality of nodes; and a controller configured to receive thresholds for one or more services in the network, wherein the thresholds define how many expected alternate protection routes are available for the one or more services for network level restoration, periodically evaluate a number of available alternate protection routes for the one or more services, notify a network operator responsive to the number of available alternate protection routes being below the thresholds, and instigate one or more remedial actions in the network based on the notify. The controller can perform a path computation to determine the alternate protection routes based on a current state of the network. The thresholds can be separately defined with and without bundle diversity which allows two paths to share at least one common link. The network operator can be notified by one of alarms, warnings, and notifications via one or more of a control plane, a Software Defined Networking (SDN) controller, and a Network Management System (NMS).

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

In various exemplary embodiments, the present disclosure relates to network level protection route evaluation systems and methods which advantageously enable proactive measures to address the risk that connections will not be able to restore given a network event. Specifically, the systems and methods provide user-defined threshold values of a number of available protect routes for an associated service. The user-defined threshold values are a minimum; the available protect routes are periodically evaluated, and alarms/warnings are provided for any services which are below their associated user-defined threshold values. The route evaluation can be performed in a network element, via the control plane, through a Path Computation Element (PCE), through a Software Defined Networking (SDN) controller, through a Network Management System (NMS), or the like. The alarms/warning provide a proactive warning to the network operator for performing remedial actions in advance such as adding additional network capacity through new equipment, defragmenting network links, rerouting existing services in a more optimal manner, increasing optical bandwidth through programmable modulation and baud rates, and the like. In this manner, the user-defined thresholds and the associated alarms/warnings provide protection route evaluation a priori which is valuable to the network operator as opposed to the conventional approach where this information is only determined after a network protection event.

Exemplary Network

Figure 1:
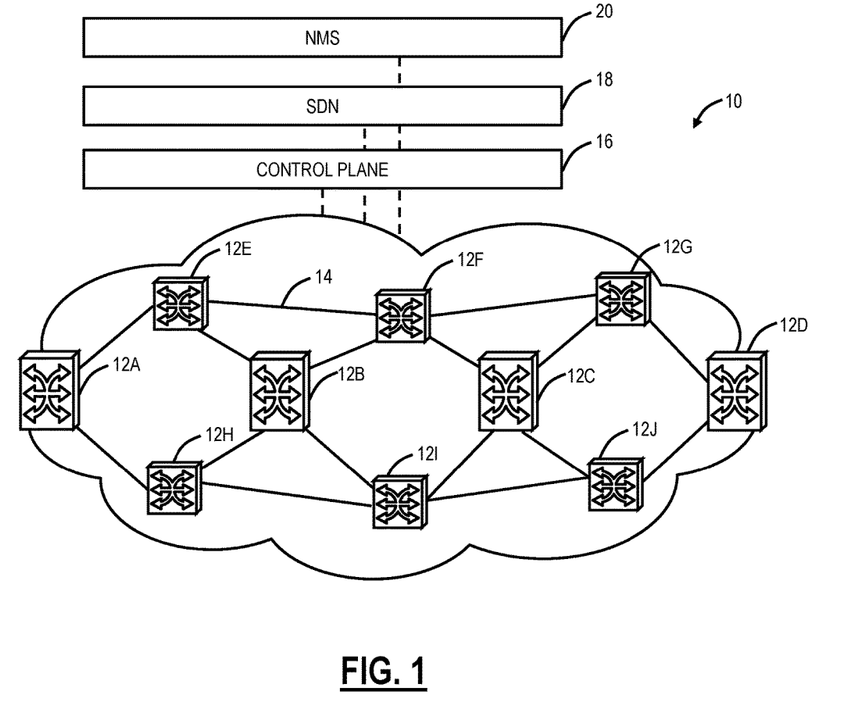
FIG. 1 is a network diagram of an exemplary network with various interconnected nodes.
Figure 2:
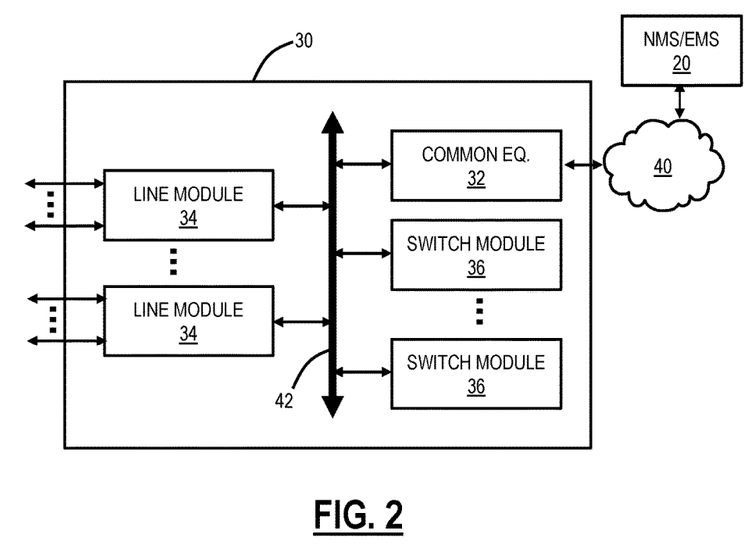
FIG. 2 is a block diagram of an exemplary node for use with the systems and methods described herein.

Referring to FIG. 1, in an exemplary embodiment, a network diagram illustrates an exemplary network 10 with various interconnected nodes 12 (illustrated as nodes 12A-12J). The nodes 12 are interconnected by a plurality of links 14. The nodes 12 communicate with one another over the links 14 through Layer 0 (L0) such as optical wavelengths (DWDM), Layer 1 (L1) such as OTN, Layer 2 (L2) such as Ethernet, MPLS, etc., Layer 3 (L3) protocols, and/or combinations thereof. The nodes 12 can be network elements which include a plurality of ingress and egress ports forming the links 14. An exemplary node implementation is illustrated in FIG. 2. The network 10 can include various services or calls between the nodes 12. Each service or call can be at any of the L0, L1, L2, and/or L3 protocols, such as a wavelength, a Subnetwork Connection (SNC), a Label Switched Path (LSP), etc., and each service or call is an end-to-end path or an end-to-end signaled path and from the view of the client signal contained therein, it is seen as a single network segment. The nodes 12 can also be referred to interchangeably as network elements (NEs). The network 10 is illustrated, for example, as an interconnected mesh network, and those of ordinary skill in the art will recognize the network 10 can include other architectures, with additional nodes 12 or with fewer nodes 12, etc. as well as with various different interconnection topologies and architectures.

The network 10 can include a control plane 16 operating on and/or between the nodes 12. The control plane 16 includes software, processes, algorithms, etc. that control configurable features of the network 10, such as automating discovery of the nodes 12, capacity on the links 14, port availability on the nodes 12, connectivity between ports; dissemination of topology and bandwidth information between the nodes 12; calculation and creation of paths for calls or services; network level protection and restoration; and the like. In an exemplary embodiment, the control plane 16 can utilize Automatically Switched Optical Network (ASON) as defined in G.8080/Y.1304, Architecture for the automatically switched optical network (ASON) (February 2005), the contents of which are herein incorporated by reference; Generalized Multi-Protocol Label Switching (GMPLS) Architecture as defined in Request for Comments (RFC): 3945 (October 2004) and the like, the contents of which are herein incorporated by reference; Optical Signaling and Routing Protocol (OSRP) which is an optical signaling and routing protocol similar to PNNI (Private Network-to-Network Interface) and MPLS; or any other type control plane for controlling network elements at multiple layers, and establishing and maintaining connections between nodes. Those of ordinary skill in the art will recognize the network 10 and the control plane 16 can utilize any type of control plane for controlling the nodes 12 and establishing, maintaining, and restoring calls or services between the nodes 12.

A Software Defined Networking (SDN) controller 18 can also be communicatively coupled to the network 10 through one or more of the nodes 12. SDN is an emerging framework which includes a centralized control plane decoupled from the data plane. SDN provides the management of network services through abstraction of lower-level functionality. This is done by decoupling the system that makes decisions about where traffic is sent (the control plane) from the underlying systems that forward traffic to the selected destination (the data plane). SDN works with the SDN controller 18 knowing a full network topology through configuration or through the use of a controller-based discovery process in the network 10. The SDN controller 18 differs from a management system in that it controls the forwarding behavior of the nodes 12 only, and performs control in real time or near real time, reacting to changes in services requested, network traffic analysis and network changes such as failure and degradation. Also, the SDN controller 18 provides a standard northbound interface to allow applications to access network resource information and policy-limited control over network behavior or treatment of application traffic. The SDN controller 18 sends commands to each of the nodes 12 to control matching of data flows received and actions to be taken, including any manipulation of packet contents and forwarding to specified egress ports. An example of SDN is OpenFlow (www.opennetworking.org).

Note, the network 10 can use the control plane 16 separately from the SDN controller 18. Conversely, the network 10 can use the SDN controller 18 separately from the control plane 16. Also, the control plane 16 can operate in a hybrid control mode with the SDN controller 18. In this scheme, for example, the SDN controller 18 does not necessarily have a complete view of the network 10. Here, the control plane 16 can be used to manage services in conjunction with the SDN controller 18. The SDN controller 18 can work in conjunction with the control plane 16 in the sense that the SDN controller 18 can make the routing decisions and utilize the control plane 16 for signaling thereof. In the terminology of ASON and OSRP, SNCs are end-to-end signaled paths or calls since from the point of view of a client signal; each is a single network segment. In GMPLS, the connections are an end-to-end path referred to as LSPs. In SDN, such as in OpenFlow, services are called "flows." In the various descriptions herein, reference is made to SNC for illustration only of an exemplary embodiment of the systems and methods. Those of ordinary skill in the art will recognize that SNCs, LSPs, flows, or any other managed service in the network can be used with the systems and methods described herein for end-to-end paths. Also, as described herein, the term services is used for generally describing connections such as SNCs, LSPs, flows, etc. in the network 10.

Additionally, the network 10 can include a Network Management System (NMS) 20 which is a management platform providing an integrated source for Operations, Administration, Maintenance, And Provisioning (OAM&P). The NMS 20 can include one or more servers and associated User Interfaces providing a network operator OAM&P access and control. Of note, the NMS 20 does not perform the same level of functionality as the SDN controller 18, i.e., the NMS 20 is more of a passive management device rather than actively involved in network control.

Exemplary Network Element/Node

Referring to FIG. 2, in an exemplary embodiment, a block diagram illustrates an exemplary node 30 for use with the systems and methods described herein. In an exemplary embodiment, the exemplary node 30 can be a network element that may consolidate the functionality of a Multi-Service Provisioning Platform (MSPP), Digital Cross-Connect (DCS), Ethernet and/or Optical Transport Network (OTN) switch, Wave Division Multiplexed (WDM)/DWDM platform, Packet Optical Transport System (POTS), etc. into a single, high-capacity intelligent switching system providing Layer 0, 1, 2, and/or 3 consolidation. In another exemplary embodiment, the node 30 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a WDM/DWDM terminal, an access/aggregation device, etc. That is, the node 30 can be any digital and/or optical system with ingress and egress digital and/or optical signals and switching of channels, timeslots, tributary units, wavelengths, etc. While the node 30 is generally shown as an optical network element, the systems and methods contemplated for use with any switching fabric, network element, or network based thereon.

In an exemplary embodiment, the node 30 includes common equipment 32, one or more line modules 34, and one or more switch modules 36. The common equipment 32 can include power; a control module; OAM&P access; user interface ports; and the like. The common equipment 32 can connect to the NMS 20 through a data communication network 40 (as well as a Path Computation Element (PCE), the SDN controller 18, OpenFlow controller, etc.). The NMS 20 can also be an Element Management System (EMS), or the like. Additionally, the common equipment 32 can include a control plane processor, such as a controller 50 illustrated in FIG. 3 configured to operate the control plane as described herein. The node 30 can include an interface 42 for communicatively coupling the common equipment 32, the line modules 34, and the switch modules 36 to one another. For example, the interface 42 can be a backplane, midplane, a bus, optical and/or electrical connectors, or the like. The line modules 34 are configured to provide ingress and egress to the switch modules 36 and to external connections on the links to/from the node 30. In an exemplary embodiment, the line modules 34 can form ingress and egress switches with the switch modules 36 as center stage switches for a three-stage switch, e.g. a three-stage Clos switch. Other configurations and/or architectures are also contemplated. The line modules 34 can include optical transceivers, such as, for example, 1 Gb/s (GbE PHY), 2.5 GB/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, OTUCn, Flexible Ethernet, etc.

Further, the line modules 34 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, 100 Gb/s, 400 Gb/s, N×1.25 Gb/s, and any rate in between as well as future higher rates. The line modules 34 can include WDM interfaces, short reach interfaces, and the like, and can connect to other line modules 34 on remote network elements, end clients, edge routers, and the like, e.g. forming connections on the links in the network 10. From a logical perspective, the line modules 34 provide ingress and egress ports to the node 30, and each line module 34 can include one or more physical ports. The switch modules 36 are configured to switch channels, timeslots, tributary units, packets, etc. between the line modules 34. For example, the switch modules 36 can provide wavelength granularity (Layer 0 switching); OTN granularity; Ethernet granularity; and the like. Specifically, the switch modules 36 can include Time Division Multiplexed (TDM) (i.e., circuit switching) and/or packet switching engines. The switch modules 36 can include redundancy as well, such as 1:1, 1:N, etc. In an exemplary embodiment, the switch modules 36 provide OTN switching and/or Ethernet switching.

Those of ordinary skill in the art will recognize the node 30 can include other components which are omitted for illustration purposes, and that the systems and methods described herein are contemplated for use with a plurality of different network elements with the node 30 presented as an exemplary type of network element. For example, in another exemplary embodiment, the node 30 may not include the switch modules 36, but rather have the corresponding functionality in the line modules 34 (or some equivalent) in a distributed fashion. For the node 30, other architectures providing ingress, egress, and switching are also contemplated for the systems and methods described herein. In general, the systems and methods described herein contemplate use with any network element providing switching of channels, timeslots, tributary units, wavelengths, etc. and using the control plane 16, the SDN controller 18, etc. Furthermore, the node 30 is merely presented as one exemplary node 30 for the systems and methods described herein.

Exemplary Controller

Figure 3:
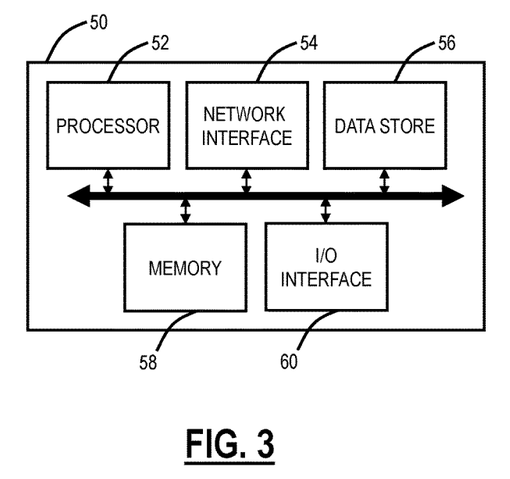
FIG. 3 is a block diagram of a controller to provide control plane processing and/or operations, administration, maintenance, and provisioning (OAM&P) for the node of FIG. 2, and/or to implement the SDN controller, a Network Management System (NMS), etc. in the network of FIG. 1.

Referring to FIG. 3, in an exemplary embodiment, a block diagram illustrates a controller 50 to provide control plane processing and/or operations, administration, maintenance, and provisioning (OAM&P) for the node 30, and/or to implement the SDN controller 18. The controller 50 can be part of the common equipment, such as common equipment 32 in the node 30, or a stand-alone device communicatively coupled to the node 30 via the DCN 40. In a stand-alone configuration, the controller 50 can be the SDN controller 18, the NMS 20, a PCE, etc. The controller 50 can include a processor 52 which is a hardware device for executing software instructions such as operating the control plane. The processor 52 can be any custom made or commercially available processor, a central processing unit (CPU), an auxiliary processor among several processors associated with the controller 50, a semiconductor-based microprocessor (in the form of a microchip or chip set), or generally any device for executing software instructions. When the controller 50 is in operation, the processor 52 is configured to execute software stored within the memory, to communicate data to and from the memory, and to generally control operations of the controller 50 pursuant to the software instructions. The controller 50 can also include a network interface 54, a data store 56, memory 58, an I/O interface 60, and the like, all of which are communicatively coupled to one another and to the processor 52.

The network interface 54 can be used to enable the controller 50 to communicate on the DCN 40, such as to communicate control plane information to other controllers, to the management system 38, to the nodes 30, and the like. The network interface 54 can include, for example, an Ethernet module. The network interface 54 can include address, control, and/or data connections to enable appropriate communications on the network. The data store 56 can be used to store data, such as control plane information, provisioning data, OAM&P data, etc. The data store 56 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 56 can incorporate electronic, magnetic, optical, and/or other types of storage media. The memory 58 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 58 may incorporate electronic, magnetic, optical, and/or other types of storage media. Note that the memory 58 can have a distributed architecture, where various components are situated remotely from one another, but may be accessed by the processor 52. The I/O interface 60 includes components for the controller 50 to communicate with other devices. Further, the I/O interface 60 includes components for the controller 50 to communicate with the other nodes, such as using overhead associated with OTN signals.

In an exemplary embodiment, the controller 50 is configured to communicate with other controllers 50 in the network 10 to operate the control plane 16 for control plane signaling. This communication may be either in-band or out-of-band. For SONET networks and similarly for SDH networks, the controllers 50 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the controllers 50 can include an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within Optical Channel Transport Unit-k (OTUk) overhead that are terminated at every 3 R (Re-shaping, Re-timing, Re-amplification) point. GCC1/2 are four bytes (i.e. each of GCC1 and GCC2 include two bytes) within Optical Channel Data Unit-k (ODUk) overhead. For example, GCC0, GCC1, GCC2 or GCC1+2 may be used for in-band signaling or routing to carry control plane traffic. Based on the intermediate equipment's termination layer, different bytes may be used to carry control plane signaling. If the ODU layer has faults, it has been ensured not to disrupt the GCC1 and GCC2 overhead bytes and thus achieving the proper delivery control plane signaling. Other mechanisms are also contemplated for control plane signaling.

The controller 50 is configured to operate the control plane 16 in the network 10. That is, the controller 50 is configured to implement software, processes, algorithms, etc. that control configurable features of the network 10, such as automating discovery of the nodes, capacity on the links, port availability on the nodes, connectivity between ports; dissemination of topology and bandwidth information between the nodes; path computation and creation for connections; network level protection and restoration; and the like. As part of these functions, the controller 50 can include a topology database that maintains the current topology of the network 10 based on control plane signaling (e.g., HELLO messages) and a connection database that maintains available bandwidth on the links 14 again based on the control plane signaling. Again, the control plane 16 can be a distributed control plane; thus, a plurality of the controllers 50 can act together to operate the control plane 16 using the control plane signaling to maintain database synchronization. In source-based routing, the controller 50 at a source node for a connection is responsible for path computation and establishing by signaling other controllers 50 in the network 10, such as through a SETUP message. For example, the source node and its controller 50 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc. which are generally a service.

Path Computation

Path computation generally includes determining a path such as by traversing the links through the nodes from the originating node to the destination node based on a plurality of constraints such as administrative weights on the links, bandwidth availability on the links, etc. Specifically, the control plane 16, the SDN controller 18, and/or the NMS 20 can perform path computation to route a specific service between originating and terminating nodes 12 in the network 10. Those skilled in the art will recognize there are a variety of techniques such as Dijkstra's algorithm for path computation. Path computation is invoked at call setup, i.e., when a new service is provisioned. Also, in some exemplary embodiments, the path computation involves determining one or more protect paths in advance, i.e., precomputed mesh restoration routes. When there is a network level event, e.g., failure of one of the links 14, network level restoration can include choosing one of the precomputed mesh restoration routes. If there are not precomputed mesh restoration routes or if these are unavailable, path computation can be invoked at the time of the network level event to determine a suitable protection path.

Between a two paths for a service, e.g., a working path and a protect path, two connections are said to be bundle diverse if they do not share any common links 14. Of course, bundle diversity is important as common links 14 increase the possibility that a failure can affect both the paths. However, bundle diversity is not always possible. For example, when computed at runtime of a network level event, a new protect path may not require bundle diversity from a failed working path if it restores service, i.e., the common links 14 are not affected by the failure on the failed working path. Two paths that are completely bundle diverse may be said to have Absolute Route Diversity (ARD).

Network Level Route Evaluation

For a network operator operating the network 10, the primary expectation with respect to protections is that services (e.g., SNCs, LSPs, etc.) should attempt to mesh restoration multiple times responsive to a failure until the network 10 has sufficient bandwidth and the network operator will be notified if any service is down (e.g., via the NMS 20, the SDN controller 18, the control plane 16, etc.). This can be referred to as a baseline and what currently occurs in the network 10. However, this provides little guidance or warning for proactive actions. With that in mind, the systems and methods described herein provide additional features and notifications enabling the network opportunity to redress inadequacies in the network 10 a priori.

Figure 4:
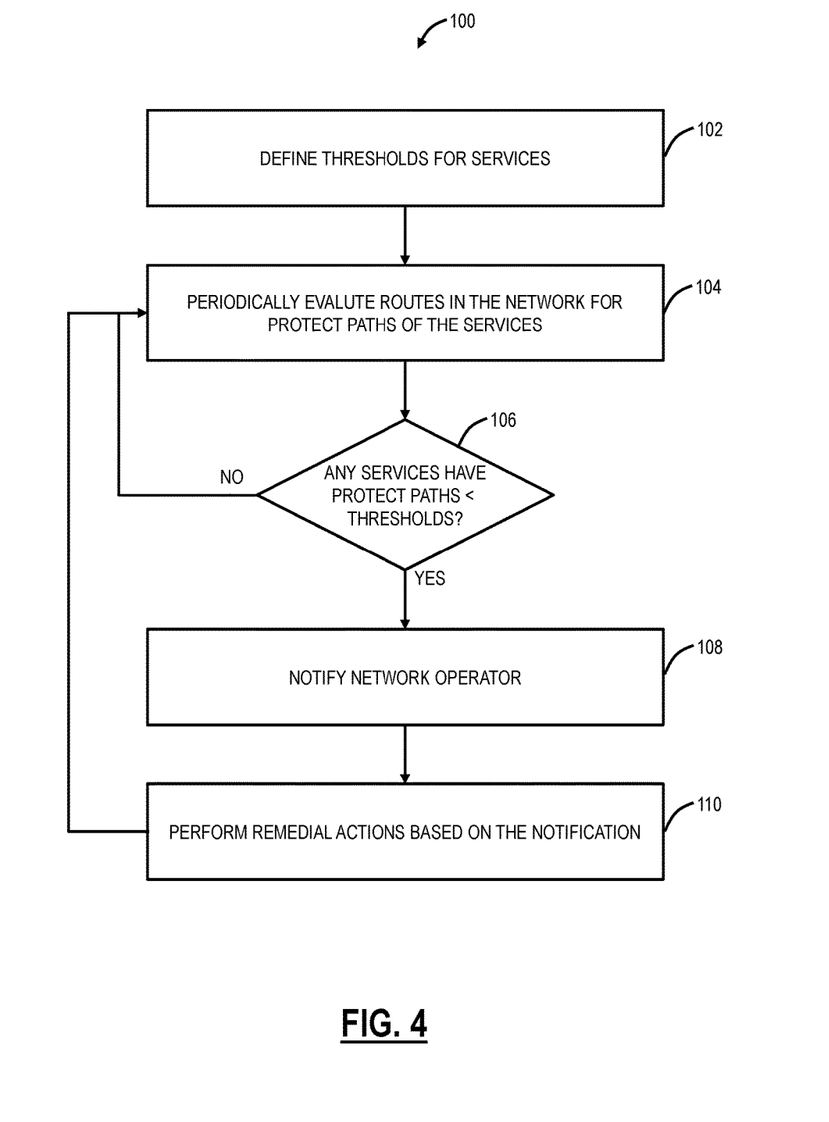
FIG. 4 is a flowchart of a network level route evaluation process which can provide feedback and enable remedial actions based on the network's ability to support mesh restoration.

Referring to FIG. 4, in an exemplary embodiment, a flowchart illustrates a network-level route evaluation process 100 which can provide feedback and enable remedial actions based on the network 10's ability to support mesh restoration. The network operator cannot predict how many times a service will get mesh restored as this is dependent on network failures in a current state of the network 10. However, the network operator wants reassurance a prior that the service can get restored at least X times. For example, assume the network operator has an SNC A which should have at least 4 mesh routes available at any time. With the systems and methods, the network operator can define a new minimum mesh restored threshold equal to 4. These thresholds are used on a continuing basis to provide the network operator about the state of network-level routes, i.e., network level route evaluation. That is, the network level route evaluation process 100 includes defining thresholds for services (step 102). This can be done at provisioning or at any time thereafter. Further, the thresholds can be adjusted as the network 10 evolves, and there can be default values such as for default levels of service.

The threshold values can be further defined in two categories—(a) total available routes (without bundle diversity) and (b) total available routes (with bundle diversity). These thresholds can include all constraints such as administrative weight/latency, bandwidth, Optical Virtual Private Networks (OPVN), etc., and the bundle diversity is shown separate between these two categories. This is because bundle diversity is nice to have for resiliency, but not required if a failure does not affect common links. That is, lack of bundle diversity is not an issue if the failure does not affect the common links from the perspective of path restoration.

With the threshold values defined, the network level route evaluation process 100 includes periodically evaluating routes in the network 10 for protect paths of the services (step 104). Here, the control plane 16, the SDN controller 18, the NMS 20, the node 30, a PCE, etc. can periodically compute available protect routes for a given service, both with and without bundle diversity. This step 104 can be run at some interval, such as daily, hourly, weekly, etc. The interval can be refined based on changes and activity in the network 10. The objective here is to determine a current ability of the service to mesh restore. With the number of protect paths determined (with and without bundle diversity), the network level route evaluation process 100 can determine if any of the services have evaluated protect paths less than the associated defined thresholds (step 106). If not, the network level route evaluation process 100 can return to step 104 and reevaluate at another interval.

If one or more services do not have threshold value routes available, the network level route evaluation process 100 includes notifying the network operator (step 108). For example, the network level route evaluation process 100 can raise some alert, alarm, or warning message, e.g., via the control plane 16, the SDN controller 18, the NMS 20, etc. The objective of the notification is to enable the network operator to perform remedial actions (step 110). For example, the network operator can perform some action in the network 10 to address these warnings, i.e., to lower a number of services which are below their threshold.

The actions can include categorizing services such as low priority, medium priority, high priority, etc. to enable higher priority services an opportunity to restore first. The actions can also include physically increasing network capacity through planning, engineering, and installation of new equipment to physically increase the bandwidth in the network 10. The actions can also include configuration changes and optimization where existing services are rerouted, bandwidth is defragmented, etc. to provide more efficient network usage which ideally would lower the number of services which are below their threshold. The actions can also include increasing available bandwidth through programmable modulation and baud rate changes in optical modems. Here, existing optical modems can increase capacity to oversubscribe links, to consume optical margin, etc., providing an efficient mechanism to increase bandwidth where needed without additional capital investment. An example of this approach is Liquid Spectrum techniques available from Ciena Corporation.

After the remedial actions are performed, the network level route evaluation process 100 can be rerun or rerun at the next period. The number of services failing the threshold can provide the network operator a quantitative view of the results of the remedial actions. Of course, adding new bandwidth via new equipment is likely to have the best results.

The notifications can have differing levels of severity based on how much below the thresholds the available protect routes are. For example, one severity scheme can include

| | |
|---|---|
| Warning: SNC<name> | The traffic is up and has other routes available as well for protection, but other available routes are below the threshold value defined. "Proactive actions require to save SNC<name> traffic" |
| Major: SNC<name> | The traffic is up, but only has one route available for protection. "Proactive actions require to save SNC<name> traffic" |
| Critical: SNC<name> | The traffic is up, but there are no available routes for protection and the next failure on the current route would result in traffic being down. "SNC<name> is running on risk" |

Additionally, the above alarms can include additional information listing the available and configured threshold for each. For example, available=3, configured=4 for warning; available=1, configured=4 for Major; and available=0, configured=4 for Critical.

Of course, when the traffic is down, there are other alarms which signify this state. The aforementioned alarms are proactive in nature in that they do not reflect a current failure or loss of traffic, but rather the possibility of such. Currently, there is an alarm <SNC is not available> alarm when SNC is down. However, this alarm does not provide any insight or ability to evaluate future failures. If the traffic is already down, the network operator can only restore the traffic. That is, this <SNC is not available> alarm is not helping to save this traffic by taking any proactive action; the network operator does not get any margin time to take necessary action to avoid any traffic outage in the network 10. In performing the remedial actions, the network operator can address critical alarms first, then major, etc.

The network level route evaluation process 100 allows the network operator an ability to configure the (a) total available routes (including all constraints) to provide a total number of routes available for an SNC where it can get meshed. It will also consider the routes which are not bundle diverse, because SNC may come up on it. This Total available route threshold can be set to a user defined value or at a default value. The network operator can also configure (b) total available routes (all constraints plus bundle diverse) to provide a total number of routes available for the SNC where it can get meshed. However, this threshold will not consider the routes which are not bundle diverse based on a current route. This Total available bundle diverse route threshold can be set to a user defined value or at a default value.

Advantageously, the network level route evaluation process 100 provides assurance to the network operator that a specific service can get <threshold value> times meshed restored. This provides some time for the network operator to take proactive action to rectify network level issues. The services which have potential risk can be categorized into three categories allowing priority for critical alarm SNC's, then major and then a warning. The network operator can perform a remedial action in advance of any network-level events avoiding traffic outages leading to a more stable network. The alarms can also be filtered to provide a single, consolidated view, e.g., a specific number of services per node 30 that are below the threshold.

Network Level Route Evaluation Example

Figure 5:
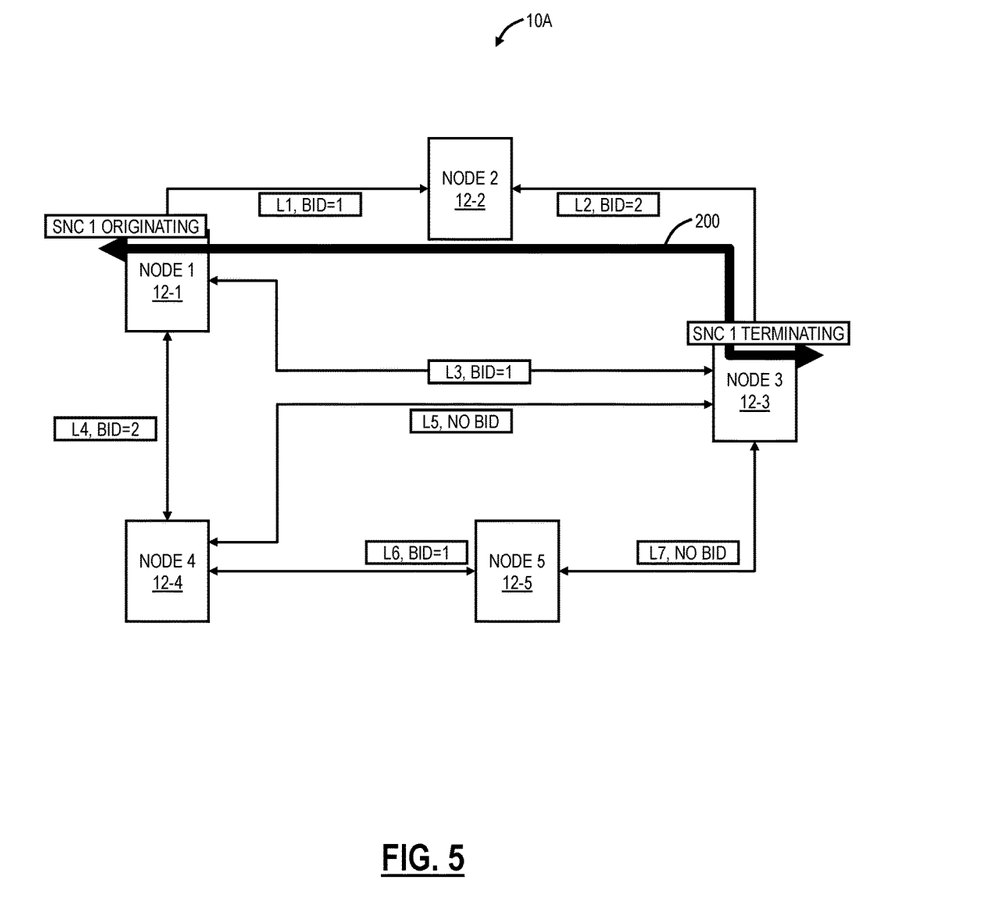
FIGS. 5-7 are network diagrams of a network with five nodes, seven links L, and an exemplary SNC, for illustrating the network level route evaluation process of FIG. 4.
Figure 6:
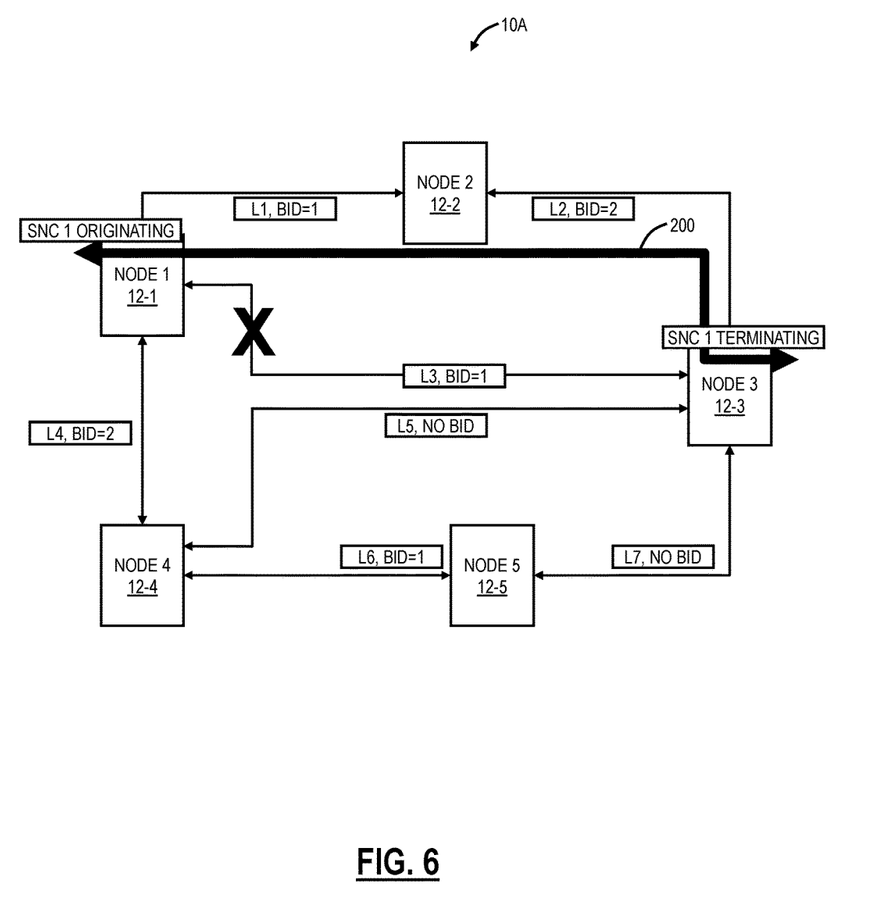
Figure 7:
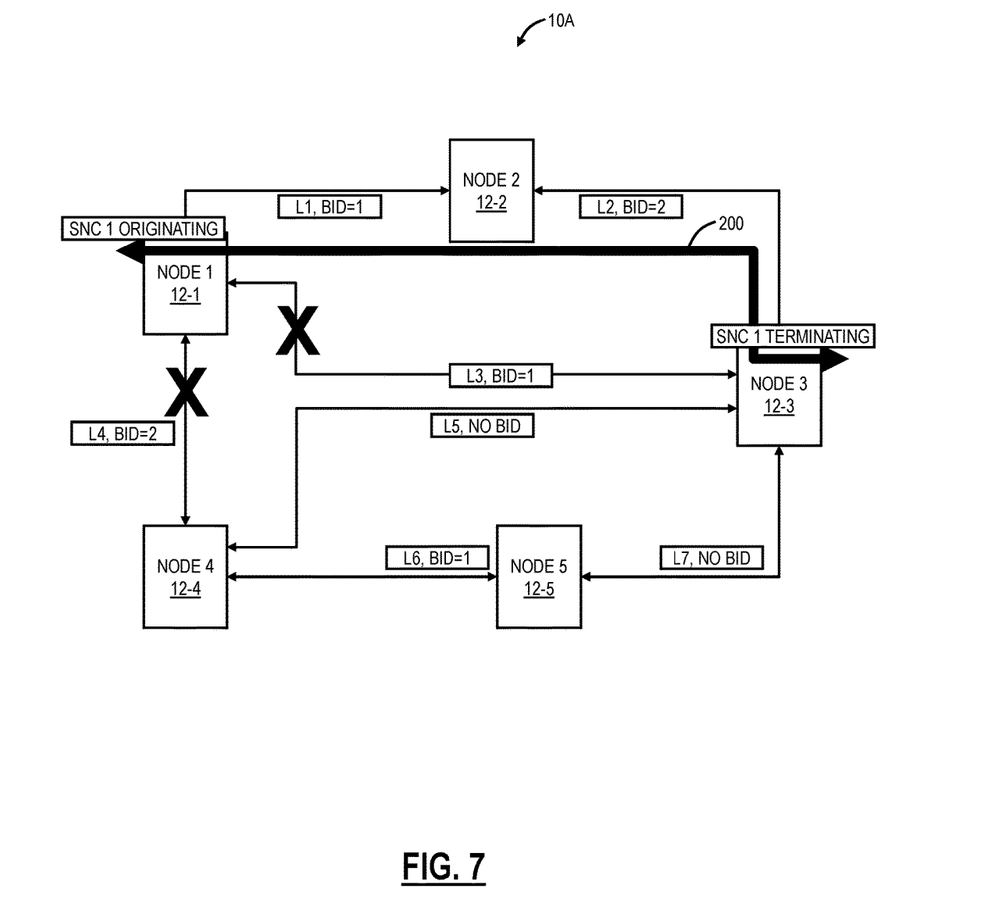

Referring to FIGS. 5-7, in an exemplary embodiment, network diagrams illustrate a network 10A with five nodes 12 (labeled as 12-1 through 12-5), seven links L (labeled as L1-L7), and an exemplary SNC 200, for illustrating the network level route evaluation process 100. In this example, the SNC 200 originates at the node 12-1, terminates at the node 12-3, and its current path is through the node 12-2 on the links L1, L2. The links L are illustrated with BID, Bundle ID. Here, there are two bundles with BID=1, 2, and links with the same BID indicate sharing of a common link in a bundle. FIG. 5 illustrates the network 10A with no failures. FIG. 6 illustrates the network 10A with one failure on the link L3, and FIG. 7 illustrates the network 10A with two failures on the links L3, L4. The network level route evaluation process 100 is now illustrated for each of these scenarios in FIGS. 5, 6, and 7.

In FIG. 5, the following routes are available for the SNC 200:

|  | Possible Routes | Routes |
|---|---|---|
| Case 1: | | |
| Total available routes (included all constraints except bundle diverse) | 3 | L3<br>L4 + L5<br>L4 + L6 + L7 |
| Case 2: | | |
| With bundle diverse  If BID-1 Fails | 2 | L4 + L5<br>L4 + L6 + L7 |
| If BID-2 Fails | 1 | L3 |

Assume the thresholds defined by the network operator are 2 for each of Case 1 and Case 2. The following output illustrates the exemplary warnings/alarms provided based thereon:

| Scenarios | Possible Routes Alarm severity | Routes Alarm text | Route Detail Alarm addition text info |
|---|---|---|---|
| Without bundle Diverse | Ok | No alarm | NA |
| With bundle diverse | Warning | "Proactive actions require to save SNC<name> traffic" OR "SNC<name>" is running on risk | Available pre-calculated paths are below the threshold:<br>Risk: BID-2 failure<br>Min. expected routes: 2<br>Availability: 1 |

Thus, after the network level route evaluation process 100 for FIG. 5, there is a warning related to a risk of BID 2 failure which can be addressed, e.g., adding a new link, etc.

Now in FIG. 6, the link L3 has a failure and the following routes are available for the SNC 200:

|  | Possible Routes | Routes |
|---|---|---|
| Case 1: | | |
| Total available routes (included all constraints except bundle diverse) | 1 | L3 |
| Case 2: | | |
| With bundle diverse  If BID-1 Fails | 0 | Not available |
| If BID-2 Fails | 1 | L3 |

Assume the thresholds defined by the network operator are still 2 for each of Case 1 and Case 2. The following output illustrates the exemplary warnings/alarms provided based thereon:

| Scenarios | Possible Routes Alarm severity | Routes Alarm text | Route Detail Alarm addition text info |
|---|---|---|---|
| Without bundle Diverse | Warning | "Proactive actions require to save SNC<name> traffic" OR "SNC<name>" is running on risk | Available pre-calculated paths are below the threshold<br>Min. expected routes: 2<br>Available routes: 1 |
| With bundle diverse | Warning | "Proactive actions require to save SNC<name> traffic" OR "SNC<name>" is running on risk | Available pre-calculated paths are below the threshold:<br>Risk: BID-2 failure<br>Min. expected routes: 2<br>Availability: 1 |
| | Major | "Proactive actions require to save SNC<name> traffic" OR "SNC<name>" is running on risk | Available pre-calculated paths are below the threshold:<br>Risk: BID-1 failure<br>Min. expected routes: 2<br>Availability: 0 |

Thus, after the network level route evaluation process 100 for FIG. 6, there are warnings related to with and without bundle diversity and a risk of BID 2 failure which can be addressed, e.g., adding a new link, etc. Further, there is a major alarm in that a BID 1 failure would leave the SNC 200 unprotected and subject to traffic loss.

Now in FIG. 7, the links L3, L4 both have a failure and the following routes are available for the SNC 200:

|  | Possible Routes | Routes |
|---|---|---|
| Case 1: | | |
| Total available routes (included all constraints except bundle diverse) | 0 | Not available |
| Case 2: | | |
| With bundle diverse  If BID-1 Fails | 0 | Not available |
| If BID-2 Fails | 0 | Not available |

Assume the thresholds defined by the network operator are still 2 for each of Case 1 and Case 2. The following output illustrates the exemplary warnings/alarms provided based thereon:

| Scenarios | Possible Routes Alarm severity | Routes Alarm text | Route Detail Alarm addition text info |
|---|---|---|---|
| Without bundle Diverse | Critical | "Proactive actions require to save SNC<name> traffic" OR "SNC<name>" is running on risk | Available pre-calculated paths are below than threshold:<br>Min. expected routes: 2<br>Available routes: 0 |
| With bundle diverse | Critical | "Proactive actions require to save SNC<name> traffic" OR "SNC<name>" is running on risk | Available pre-calculated paths are below the threshold:<br>Risk: BID-2 failure<br>Min. expected routes: 2<br>Availability: 0 |
| | Critical | "Proactive actions require to save SNC<name> traffic" OR "SNC<name>" is running on risk | Available pre-calculated paths are below the threshold:<br>Risk: BID-1 failure<br>Min. expected routes: 2<br>Availability: 0 |

Thus, after the network level route evaluation process 100 for FIG. 7, the network operator is informed that the risk level is critical and a failure of the SNC 200 would leave traffic down.

Health Check Counters and Route History

In another exemplary embodiment, a health checkup tool can check the status of each service, e.g., SNC, in 15 min. and 24 hour intervals and maintain the results in a single file format. The health checkup tool is different from current Performance Monitoring (PM) counters as it has different attributes, such as Mesh/Meshed-Failed/Switched/Preempted/Preempted-Failed, etc. The health checkup tool can keep "Counter level statistics" and "Route level statistics." Again, the network 10 can have significant complexity with hundreds of nodes 12. Very frequently, services in the network 10 change their routes due to Mesh, Manual initiated commands, Reversions, preemption, etc. Mesh can be due to fiber cuts, hardware failure in networks or SNCIC (due to path defects). Manual initiated commands can be Manual Switch to Protect, Revert, Regroom, etc. Reversions can occur after recovery and timer expiration. Preemption can occur based on other services requiring resources. Collectively, these network changes can be successful, but also can fail for network or configuration issues.

There are no efficient mechanisms to monitor individual services (e.g., SNC/SNCP) that monitor (a) how this SNC is behaving in the past and what is its performance is currently; (b) what was its history, how many time this SNC got meshed/preempted/SNCIC/Switched, etc.; (c) what is the frequency of this SNC for failing? And what generally happens to this SNC when it fails; (d) how long the SNC has been running in a good condition; (e) how many times mesh restoration of the SNC failed, etc.

Conventionally, the network operator can get some notification, but only on different-different tabs/screens such as alarm and event, but it is not easy for operators to filter all history information for this SNC in a single, unified format with (a) diagnostic messages, (b) incarnation number; and (c) alarm and events.

The systems and methods provide a health checkup tool for SNC/SNCP like performance monitoring which can tell the network operator about the following status, such as for 15 min. and 24 hour intervals:

| Counter level statistics: |
| --- |
| 1. How long (in seconds) the SNC has been operating on its home route and how many times (in counts) the SNC got up on the home route |
| 2. How (in seconds) long the SNC has been operating on an alternate route and how many times (in counts) the SNC went to non-home routes |
| 3. How many times (in counts) the SNC was mesh restored (fiber cuts, SNCIC, hardware failures, etc.) and what were the home route/previous route/current route (with span details) |
| 4. How many times (in counts) the SNC's mesh attempts failed |
| 5. How many times (in counts) the SNC was switched (MSP, Revert, Regroom) and what were the home route/previous route/current route (with span details) |
| 6. How many times (in counts) the SNC was restored on its home path via expiration of timers and what were the home route/previous route/current route (with span details) |
| 7. How many times (in counts) SNC reversion failed and what were the home route/previous route/current route (with span details) |
| 8. How many times (in counts) the SNC was restored based on preemption and what were the home route/previous route/current route (with span details) |
| 9. How many times (in counts) preemption attempts failed |
| 10. How many times (in counts) the SNC was mesh restored based on preemption and what were the home route/previous route/current route (with span details) |
| Route level statistics: |
| 9. What was the SNC's home route within the last 15 min. and 24 hour interval |
| 10. What was the previous route within the last 15 min. and 24 hour interval |
| 11. What is the current route |

The above performance monitoring detail can be maintained in the form of span details end-to-end in 15 min. and 24 hour intervals both current and history.

If the network operator has access to this performance monitoring detail in a unified format, the operator can analyze the network 10 in an efficient manner. For example, (1) if any SNC is not coming up on its home route for a while, the operator can be prompted to identify issues with that SNC. Is this intentional (non-revertive) or is the home route having issues (down or other SNC's have occupied this home route). The operator can identify the type of issue and perform corrective actions. (2) If the operator finds that this SNC is having high mesh counts, this could indicate the route which this SNC is following, has some issue. So, the operator can check its route history and isolate the section which result in the frequent mesh restoration. (3) If the operator found SNC switch counters are high, then the operator can analyze why this SNC requires frequent maintenance windows and possibly change the route/configuration.

(4) Similarly, for how many time this SNC got restored via preemption, if this counter is high, the network 10 is having bandwidth issues which need to be addressed. (5) Similarly, if preempted counters are high for an SNC, this SNC is frequently impacted due to other preempting SNCs. If it is extra traffic or low priority traffic, this is likely acceptable, otherwise, a solution is needed either by introducing new lines, changing its preemption priorities, or changing the routes. (7) If the SNC's mesh attempts fail, there is an issue to resolve—what was its route at that time etc.

The network operator can check SNC's route histories in file tabular or file format and can easily analyze below: (a) when this SNC was created and what was its home route; (b) when its home route changed and what were the changes; (c) what is the current route, and any recent changes. With this data efficiently provided, the network operator can identify the spans where most issues are seen, and rectify any issues. Additionally, there can be user-defined threshold values so that if any SNC crosses, an alarm is raised.

The health checkup tool can be implemented via a User Interface (UI) through the node 12 and the control plane 16, through the SDN controller 18, through the NMS 20, etc. The health checkup tool can provide on an individual SNC basis all activities and statuses in counter form. Again, the counters can be in 15 min. and 24 hour intervals. Past counters can be maintained over time for history. Threshold crossing values can be user defined to enable notifications.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of network level protection route evaluation and remediation in a network, the method comprising:
    in the network which is controlled by a control plane, determining thresholds for one or more services in the network, wherein the thresholds define how many expected alternate protection routes are available at a given time for the one or more services for network level restoration that includes mesh restoration, wherein the alternate protection routes are available to restore the one or more services due to a failure in an active path;
    periodically evaluating, based on a current state of the network, a number of available alternate protection routes for the one or more services from originating to terminating nodes;
    notifying a network operator responsive to the number of available alternate protection routes being below the thresholds; and
    performing one or more remedial actions in the network based on the notifying through the control plane to change a configuration of the network to provide additional alternate protection routes, wherein the notifying comprises one of alarms, warnings, and notifications separated into a plurality of levels with a first level being the one or more services have available alternate protection routes but are below the defined thresholds, a second level being the one or more services have only one available alternate protection route, and a third level being the one or more services have no available alternate protection routes.

2. The method of claim 1, wherein the periodically evaluating comprises performing path computation to determine the alternate protection routes based on a current state of the network.

3. The method of claim 1, wherein the thresholds are separately defined with and without bundle diversity which allows two paths to share at least one common link.

4. The method of claim 1, wherein the notifying comprises one of alarms, warnings, and notifications via the control plane.

5. The method of claim 1, wherein the remedial actions are performed based on the plurality of levels.

6. The method of claim 1, wherein the remedial actions comprise one or more of adding additional network capacity through new equipment, defragmenting network links, rerouting existing services for optimization, and increasing optical bandwidth through programmable modulation and baud rates.

7. An apparatus configured to perform network level protection route evaluation and remediation in a network, the apparatus comprising:
    a network interface communicatively coupled to a network under control;
    one or more processors; and
    memory storing instructions that, when executed, cause the one or more processors to
        receive thresholds for one or more services in the network, wherein the thresholds define how many expected alternate protection routes are available at a given time for the one or more services for network level restoration, wherein the alternate protection routes are available to restore the one or more services due to a failure in an active path, wherein the network utilizes a control plane and the network level restoration includes mesh restoration;
        periodically evaluate a number of available alternate protection routes for the one or more services based on a current state of the network from originating to terminating nodes;
        notify a network operator responsive to the number of available alternate protection routes being below the thresholds; and
        instigate one or more remedial actions in the network based on the notify to change a configuration of the network to provide additional alternate protection routes,
    wherein the network operator is notified by one of alarms, warnings, and notifications separated into a plurality of levels with a first level being the one or more services have available alternate protection routes but are below the defined thresholds, a second level being the one or more services have only one available alternate protection route, and a third level being the one or more services have no available alternate protection routes.

8. The apparatus of claim 7, wherein the periodically evaluation comprises a path computation to determine the alternate protection routes based on a current state of the network.

9. The apparatus of claim 7, wherein the thresholds are separately defined with and without bundle diversity which allows two paths to share at least one common link.

10. The apparatus of claim 7, wherein the network operator is notified by one of alarms, warnings, and notifications via the control plane.

11. The apparatus of claim 7, wherein the remedial actions are performed based on the plurality of levels.

12. The apparatus of claim 7, wherein the remedial actions comprise one or more of adding additional network capacity through new equipment, defragmenting network links, rerouting existing services for optimization, and increasing optical bandwidth through programmable modulation and baud rates.

13. A network configured to provide network level protection route evaluation and remediation, the network comprising:
   a plurality of nodes;
   a plurality of links interconnecting the plurality of nodes; and
   a controller which is one of configured to implement a control plane, wherein the controller is configured to
      receive thresholds for one or more services in the network in the network, wherein the thresholds define how many expected alternate protection routes are available at a given time for the one or more services for network level restoration that includes mesh restoration, wherein the alternate protection routes are available to restore the one or more services due to a failure in an active path,
      periodically evaluate a number of available alternate protection routes for the one or more services based on a current state of the network from originating to terminating nodes,
      notify a network operator responsive to the number of available alternate protection routes being below the thresholds, and
      instigate one or more remedial actions in the network based on the notify to change a configuration of the network to provide additional alternate protection routes,
   wherein the network operator is notified by one of alarms, warnings, and notifications separated into a plurality of levels with a first level being the one or more services have available alternate protection routes but are below the defined thresholds, a second level being the one or more services have only one available alternate protection route, and a third level being the one or more services have no available alternate protection routes.

14. The network of claim 13, wherein the controller performs a path computation to determine the alternate protection routes based on a current state of the network.

15. The network of claim 13, wherein the thresholds are separately defined with and without bundle diversity which allows two paths to share at least one common link.

16. The network of claim 13, wherein the network operator is notified by one of alarms, warnings, and notifications via the control plane.

* * * * *